Figure 1:
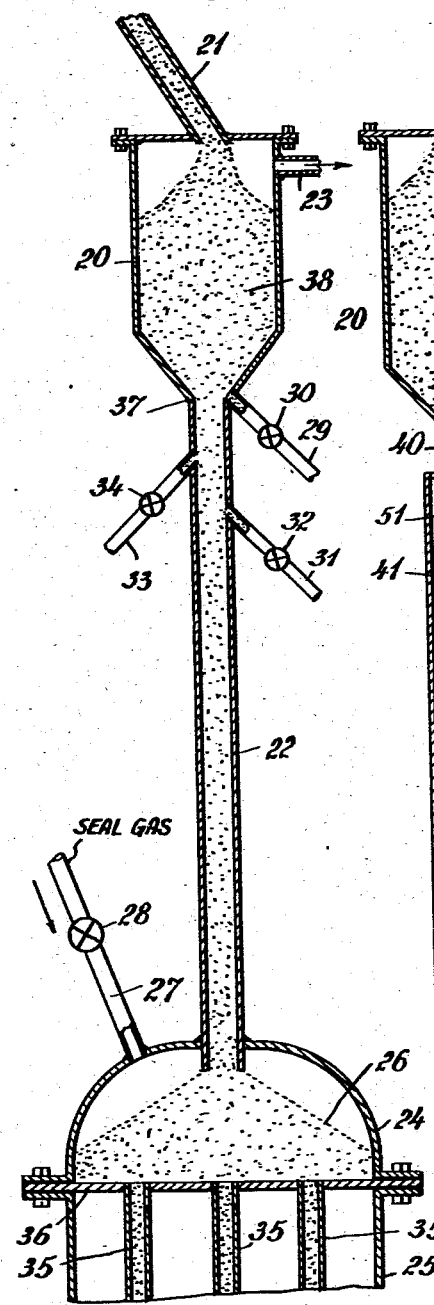

May 18, 1948.      T. P. SIMPSON      2,441,724
METHOD AND APPARATUS FOR OPERATIONS WITH A CONTACT MASS
Original Filed March 3, 1944    2 Sheets-Sheet 1

INVENTOR
THOMAS P. SIMPSON
BY
ATTORNEY

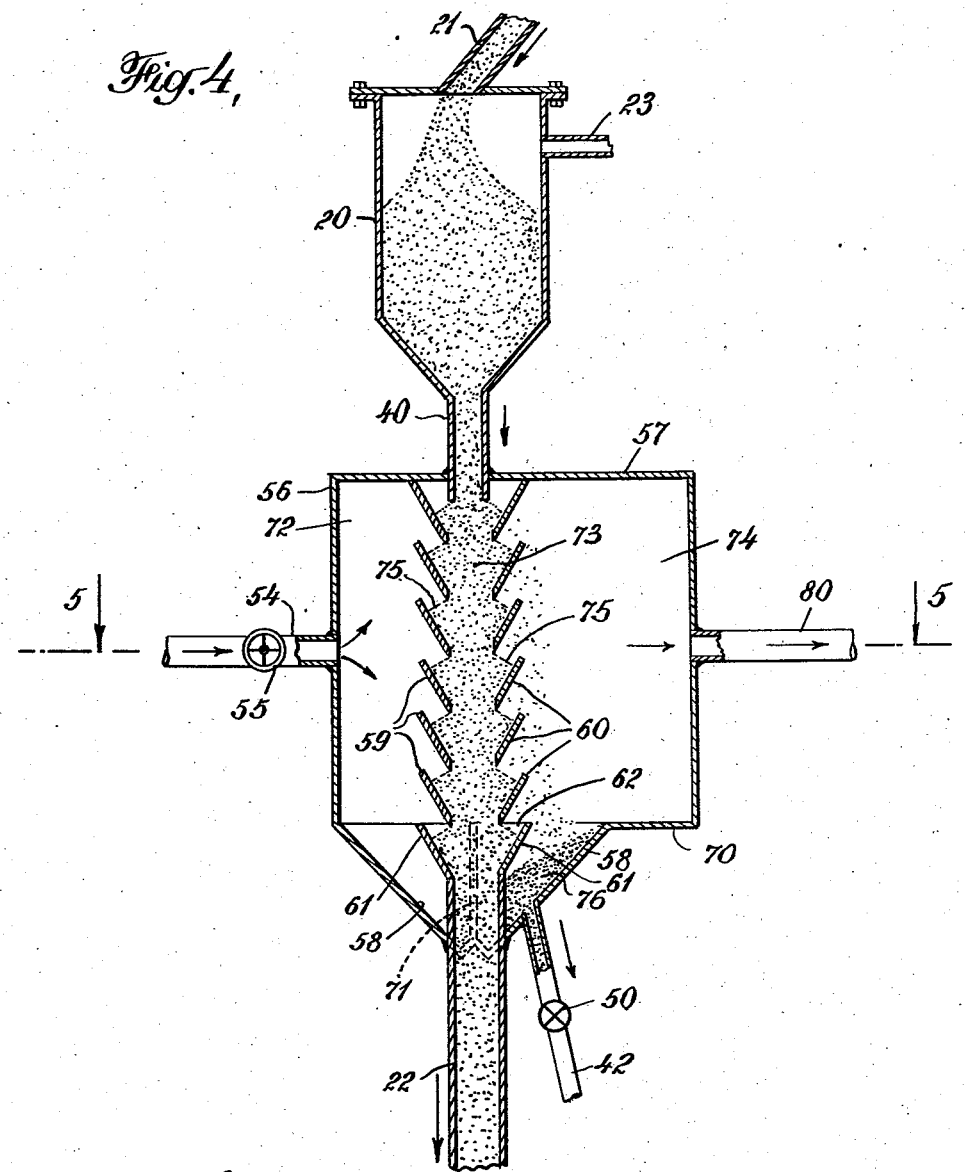
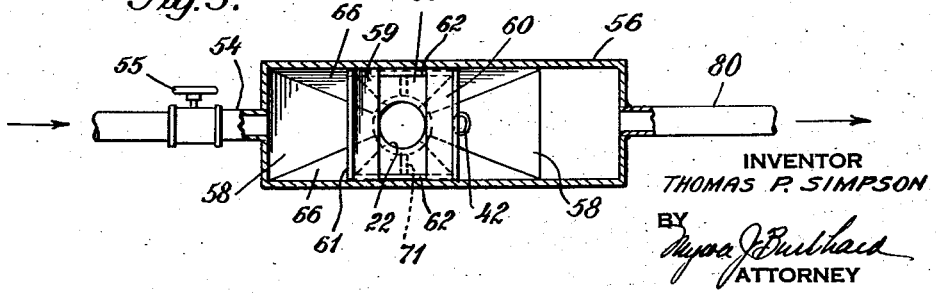

Patented May 18, 1948

2,441,724

UNITED STATES PATENT OFFICE 2,441,724

METHOD AND APPARATUS FOR OPERATIONS WITH A CONTACT MASS

Thomas P. Simpson, Woodbury, N. J., assignor to Socony-Vacuum Oil Company, Incorporated, a corporation of New York Original application March 3, 1944, Serial No. 524,925. Divided and this application April 13, 1945, Serial No. 588,173

4 Claims. (Cl. 23—1)

This application is a division of copending application Serial Number 524,925, filed March 3, 1944, and which is now Patent No. 2,416,230, dated February 18, 1947.

This invention deals with a method and apparatus for introduction of a contact mass material into a vessel wherein fluids are contacted with a continuously flowing particle form contact mass under pressure substantially above that of an external contact mass supply hopper. The contact mass material may be used in such processes as a catalyst for desired fluid reactions or it may be used for other purposes. Exemplary of processes of this kind is the cracking conversion of hydrocarbons, it being well known that hydrocarbons of a gas oil nature boiling between about 500° F. and 750° F. may be cracked to gasoline and other products by passing them at a reaction temperature and pressure such as, for example, temperatures of the order of 750° F and higher and pressures somewhat above atmospheric in contact with a solid adsorptive catalytic contact mass. Usually such contact masses partake of the nature of fuller's earth, or other natural or treated clays and/or various synthetic associations of alumina, silica and alumina and silica, any of which may have other constituents added for a purpose in connection with the process such as certain metallic oxides. Such contact masses are often used in form of various shaped particles, and it is generally practical to use a certain range of particle sizes rather than any set single particle size.

In a most recent form this process has been developed as one in which the particle form contact mass material is moved cyclically through two zones in the first of which it is subjected to fluid reaction and in the second of which it is subjected to the action of a fluid regeneration medium such as a combustion supporting gas, acting to burn off contaminant materials deposited upon the contact mass during reaction. Generally hoppers are provided above each of said zones from which hoppers the contact material gravitates to the said zones through suitable confined passages and conveyors such as bucket elevators are provided to convey the contact material from the drain from one zone to the hopper above the other.

This invention has specifically to do with a method and apparatus for the transfer of contact material from the hoppers to the respective zones therebelow. It is usually necessary to operate one or both of said zones above atmospheric pressure and it is generally economical and practically desirable to operate the conveyors and surge hoppers at a pressure below that in the zones such as atmospheric. It has been found that if the confined passage or pipe connected between the hopper and conversion vessel is of sufficient vertical length and that if the convertor is operated so as to cause throttling of the flow of contact material from the lower end of said pipe, the contact material will gravitate down through said pipe and into the convertor against the higher fluid pressure in said convertor. Such a system is disclosed and covered by the patent to Simpson et al., No. 2,410,309, dated October 31, 1946, in which the present applicant is one of the patentees.

Due to the positive pressure differential between the convertor and the hopper, vapor reactants or more generally an inert seal vapor generally used in the upper section of the convertor will pass upwards through the column of downwardly flowing contact material and out from the top of the hopper. This vapor flow has a retarding action on the downward motion of the contact material, the retarding force being greater for particles of smaller size and/or lower density. The rate of upward vapor flow and the retarding action thereof on the downward flow of contact material in the pipe between the convertor and the hopper increases as the vertical length of said pipe approaches the minimum required to force contact material flow; and below this minimum the rate of vapor flow is sufficient to prevent the downward flow of contact material. Since the length of conveyors and the structural steel requirements increase with increase in vertical length of the contact material flow pipe between the convertor and hopper, it is desirable to limit the vertical length of said pipe as near as practical to the minimum required for contact material flow. Also since for the same pressure differential between the convertor and hopper the rate of vapor flow through the contact material column therebetween will increase with increase in average particle size and since for the same vapor flow rate the retarding effect due thereto varies for different size contact material particles, it is desirable to limit the range of particle size of the contact material within as narrow limits as are practical and to provide sufficient vertical pipe length between the convertor and hopper to insure downward flow of the smaller particles present in the contact material mass. As an example of a typical practical range of contact material particle size, material made up of particles ranging from 8 to 40 mesh size has been found useful for some operations.

It has been found during the use of such contact material feed pipes of the type above described that under certain heretofore unpredictable circumstances, especially when the length of the feed pipe was such that the head created by the column of contact material therein was only a little greater than that in the convertor, the flow of contact material through the feed pipe to the convertor would suddenly substantially entirely stop and could not generally be re-established without release of the convertor pressure. This not only necessitates diverting the reactant vapors from the convertor thereby resulting in the loss of operating time but also seriously upsets the operating conditions of the entire cyclic system and of the product fractionating system thereby causing a further loss in operating time.

After extensive investigations it was finally discovered that these unpredictable contact material flow interruptions were caused by gradual accumulations of undersized contact material in the upper section of the feed leg. Due to the normal gradual attrition of the contact material particles in the course of flow through a continuous cyclic system such as hereinbefore described, small quantities of fines or undersized material of much smaller diameter than the average diameter of the normal sized contact material accumulate in the contact material mass and are delivered into the hopper above the feed leg along with the normal size contact material. Up to a certain maximum percentage of this undersized material is swept down through the feed pipe into the convertor by the larger particles. If more than this percentage of undersized material is present in the contact material supply to the convertor feed pipe, the excess is prevented by the upward flowing inert vapor in the feed pipe from passing down therethrough. In fact, some very small particles which have been swept down a short distance into the feed pipe may actually be forced upwards by the vapor flow. Thus the excess undersized material gradually accumulates in the upper part of the feed pipe and especially at the top thereof. When the accumulation at the top of the pipe becomes sufficient the main bulk of contact material flow sweeps it down a short distance into the feed pipe. The result is a localized zone in the feed pipe in which the percentage of undersized material is very high. The retarding effect of the vapor passing up through the larger contact material in the column below this zone is much greater on the very fine size material and is sufficient to stop the downward flow of said fine size material and the flow of substantially all the contact material thereabove, thereby stopping the flow of contact material to the convertor.

A major object of this invention is the provision of a system for continuous, uninterrupted introduction of particle form contact mass material to a zone operating under pressure for contact with a gaseous material therein.

A specific object of this invention is the provision in a continuous cyclic process of the type hereinbefore described of a means for prevention of interruptions, due to accumulation of undersized contact material particles, of gravitational flow of particle form contact mass material in feed pipes to conversion vessels operating under fluid pressures substantially above those at the inlet to said feed pipes.

These and other objects will become apparent in the following description of this invention. Inasmuch as the system of this invention will apply equally well to contact material feed pipes supplying regenerators, convertors or other vessels operating under gaseous pressures above those at the supply end of said feed pipes, the term convertor will hereinafter be used in the description and claiming of this invention in a sense sufficiently broad to cover any of these applications.

Figure 2:
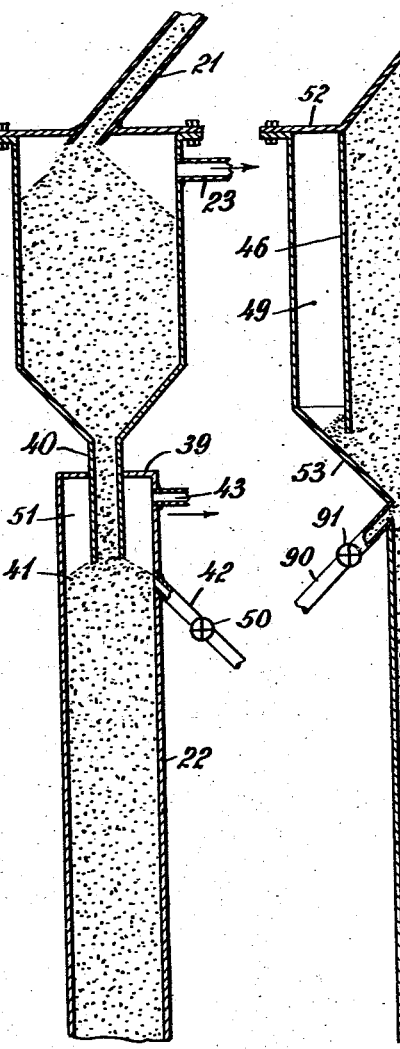
Figure 3:
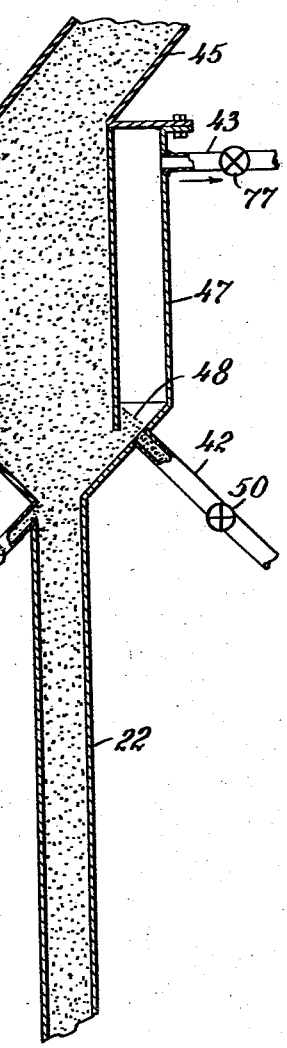

In order to better understand this invention reference should now be made to the drawings attached hereto. In these drawings, Figure 1 is an elevational view, partially in section, showing one form of the invention. Figure 2 is an elevational view, partially in section, showing a preferred method for removing undersized contact material from the upper end of the convertor feed pipe. Figure 3 shows an equivalent method and apparatus for accomplishing the same purpose. Figure 4 is an elevational view, partially in section, showing another preferred apparatus and method for preventing accumulation of undersized contact material in the convertor feed pipe. Figure 5 is a sectional view taken at line 5—5 in Figure 4.

Turning now to Figure 1, we find a hopper 20 to the top of which is connected contact material inlet pipe 21 and near the top of which is connected a vapor vent pipe and in which hopper is an accumulation of contact material 38. At a location below the hopper is the head section 24 of a conversion vessel 25, which head section is terminated by plate 36 extending horizontally across said head section. Depending from the plate 36 are the open end pipes 35 which extend down to the convertor reaction zone. Within the head section is maintained an accumulation of particle form contact material 26 from which contact material flows through pipes 35 to the reaction zone (not shown). Connected to the top of the head section is the pipe 27 with valve 28 therein. Connected between the hopper 20 and convertor head section 24 is the pipe 22 which should be of such length that the head created by the column of contact material therein may be greater than the pressure differential between the convertor head section 24 and hopper 20. This contact material feed pipe 22 may be of any desired cross sectional shape but the cross sectional area thereof must be sufficient to allow the desired contact material flow rates. It is obvious that two or more smaller pipes could be used instead of one single pipe. Moreover, these pipes need not be absolutely vertical but may form any slope with the horizontal that is greater than the normal angle of repose of the contact material being used. Vertical pipes, however, have been found preferable.

In the description and claiming of this invention, the term contact material "feed pipe" will be used in a sense sufficiently broad to cover the use of one or more pipes having any slope with the horizontal which is greater than the normal angle of repose of the contact material and having any desired cross sectional shape. In the description and in the claiming of this invention the term "head" as used in connection with the column of contact material in the feed leg to the conversion zone or to the conversion zone seal chamber is intended to mean the total weight of contact material in the feed leg column above its lower end per unit of feed leg cross-sectional area. The head may be determined by measuring the volume of the feed leg above its lower end, multiplying the volume by the weight per unit of volume of the contact material measured as a substantially compact mass of downwardly flowing particles and dividing by the cross-sectional area of the feed leg at its lower end.

Connected to pipe 22 at location adjacent to the connection 37 between the hopper 20 and pipe 22 are downwardly sloping pipes 33 and 31 in which are the valves 34 and 32 respectively. Connected to the hopper 20 at a location adjacent to the connection between hopper 20 and pipe 22 is the downwardly sloping pipe 29 with valve 30 therein. The slope of any of these pipes with the horizontal is at least equal to the angle of slide of the contact material used. This angle of slide is that minimum angle of a flat smooth surface with the horizontal required for gravitational slide therefor of a layer of contact material one particle thick.

In operation particle form contact mass material is delivered by a conveyor to pipe 21 through which it passes to the accumulation of contact material 38 in hopper 20. From the bottom of the hopper 20 contact material continuously flows through vertical pipe 22 to the head section 24 of the convertor and then through pipes 35 to the conversion zone. The contact material flow from the bottom of the conversion zone is throttled so as to maintain the contact material in the conversion zone and in the pipe 22 as a substantially continuous column or stream of closely packed particle form downwardly flowing contact mass material. The pressure in the conversion zone may be above atmospheric, for example, in the order of eight pounds per square inch gauge. Inert gas, such as steam, is introduced through control valve 28 and pipe 27 into the head section 24 in the space above the accumulation of contact material 26 therein at such a rate as to maintain the pressure in head section 24 equal to or slightly above that in the convertor. Thus conversion vapors are prevented from entering head section 24 and flowing upwards through pipe 22, but a limited amount of inert gas does flow upwards through the column of contact material in pipe 22 and out through vent 23 near the top of hopper 20. If the percentage of undersized contact material, say, for example, 300 mesh size material, present in the supply to pipe 22 is greater than the maximum percentage of such material which will be swept down through pipe 22 to the convertor by the normal size material particles, say for example, 10–30 mesh size, then the excess of said undersized material will accumulate in that section of the pipe 22 adjacent its connection with the hopper 20. Such accumulated undersized contact material and some normal size material is periodically or preferably continuously withdrawn from the system through pipes 29, 33 or 31 or any combination thereof. The undersized material thus withdrawn may be screened from the normal sized material or separated therefrom by other known methods and the normal size material may then be returned to the cyclic system at some convenient location. The proper placement of the pipes 29, 33 and 31 at locations where the undersized contact material tends to accumulate is dependent upon a number of variables such as relative size of undersized and normal sized contact material, vapor and contact material, vapor and contact material flow rates and other variables inherent in a given specific application. The proper location of these pipes is best determined experimentally for the particular conditions involved. As an example, it was found that in an apparatus having a 20 foot vertical feed pipe connected at its lower end to a chamber wherein air pressure was 5 to 6 pounds per square inch gauge and at its upper end to a supply funnel at 0 pounds per square inch gauge, when the linear rate of flow of a nominal 8 to 30 mesh particle form contact mass material of approximately 48 pounds per cubic foot apparent unpacked density was about 2 to 20 feet per minute, the undersized contact material was found to accumulate in the pipe within about the upper third and principally at the inlet to said pipe.

Since the principal accumulation of undersized contact material particles occurs generally at or near the upper end of the feed pipe, material withdrawn from only that location may contain lower percentage of the normal size particles of contact material, it is generally preferable to withdraw material only from that location. An apparatus more suitable for accomplishing this purpose is shown in Figure 2.

In Figure 2, is shown a hopper 20 and the upper section of a contact material feed pipe 22, the lower end of which pipe connects into a convertor head section (not shown) in which is maintained a gaseous pressure. The upper end of pipe 22 is closed by plate 39 to which is connected and through which extends the pipe 40, the upper end of which is connected to the bottom of the hopper 20. The pipe 40 may extend a short distance, for example, about one or two feet or less, down within pipe 22 thereby providing the vapor-solid disengaging space 51 in the top section of pipe 22. Connected to the pipe 22 near the top of space 51 is the vent pipe 43.

The inert blanket gas from the convertor head section passes up through the column of contact material maintained in pipe 22 and disengages from the contact material in the lower section of the space 51 and passes from the system through pipe 43. If desired the cover plate 39 may be omitted and vapor withdrawn at this location. Excess undersized contact material particles, if present accumulate mainly at the surface 41 of the contact column and may be easily withdrawn through pipe 42 and control valve 50 therein before the accumulation of said material becomes sufficient to cause interference with the flow of contact material in pipe 22. It is important that the slope of pipe 42 be sufficient to permit flow of contact material therethrough. Slopes of 40° or more with the horizontal have been found satisfactory for most particle form contact materials.

It should be understood that the hopper 20 in Figures 1 and 2 need not necessarily be a separate vessel but may be merely an enlarged connecting pipe between a conveyor and the top of the contact material feed pipe. Unless otherwise specified, the word "hopper" as used in this specification, and in the claiming of this invention will be used in a sense sufficiently broad to cover either construction.

In Figure 3 is shown an example of this latter construction. In this figure, 45 is the contact material passage pipe from a contact material conveyor (not shown) and 46 is a vertical continuation thereof. Positioned concentrically with pipe 46 is pipe 47 which is connected to pipe 46 and closed off at its upper end by plate 52. The lower end of pipe 47 is connected to pipe 22 by means of the conical section 53. The lower end of pipe 46 extends down through pipe 47 short of this conical section.

In operation inert gas after passing upwards through convertor feed pipe 22 countercurrent to contact material flow therein disengages from the contact material at surface 48 and leaves the system through vent pipe 43. If the pressure at the top of the pipe 22 is to be maintained other than atmospheric, the valve 77 in pipe 43 is used to throttle the gas flow therethrough. Excess undersized contact material, if present, accumulates at the surface 48 and a short distance therebelow and is withdrawn from the system through drain pipe 90 having valve 91 therein or through drain pipe 42 connected to the conical section 53.

Although the systems described under Figures 2 and 3 are designed to permit withdrawal of a reasonably concentrated side stream of undersized particle form contact material, still an appreciable percentage of the material withdrawn may be normal size contact material which must be separated externally from the undersized material before return to the system. The method and apparatus above described in relation to Figures 1 through 3 inclusive are the subject of the claims in my Patent No. 2,416,230, dated February 18, 1947.

A method of withdrawing a side stream of contact material from the convertor contact material feed system which consists almost entirely of undersized contact material particles is shown in Figures 4 and 5. Figure 4 is an elevational view, partially in section, showing the upper end of a convertor feed pipe 22, a hopper 20 and inserted therebetween an apparatus for removal of undersized contact material. Figure 5 which should be read together with Figure 4 is a sectional view of this apparatus taken at line 5—5 of Figure 4.

A pipe 40 is connected to the top 57 of the rectangular box-shaped vessel 56 and extends a short distance down into the vessel. The lower end of vessel 56 is closed partially by plate 70 and partially by the pairs of oppositely placed plates 58 and 66 which slope downwards from the sides of vessel 56 to the periphery of the pipe 22 to which they are fitted and welded at a location somewhat below the upper end of said pipe 22. Thus there is formed a tapered drain section on the bottom of vessel 56, near the bottom of which drain section is connected a drain pipe 42 with valve 50 therein. Near the upper end of the pipe 22 is fitted and welded a funnel of rectangular cross sectional shape which is formed by pairs of oppositely placed plates 62 and 62, the plates 62 sloping upwards from pipe 22 to two opposite sides of the vessel 56 and attached thereto and the plates 61 sloping upwards from pipe 22 so as to form the bottom baffles of the two baffle formed walls to be described hereinafter. The vessel 56 is internally divided into a vapor inlet section 72, a contact material passageway 73 and a vapor outlet section 74 by means of two vertical walls formed by two rows of superposed plate baffles 59 extending horizontally across the vessel 56 in a direction perpendicular to that of the drawing. These plates are so spaced and arranged as to form essentially two parallel louvered or slotted walls through the slots of which vapors may freely pass but through which the contact material will not fall or flow. It will be seen that the top plate baffles of each wall extend up to and are connected to the top 57 of vessel 56 thereby preventing vapor channeling over the top of the contact material column confined between the two louvered walls. Also to prevent bypassing of vapor through the drain section 76 of vessel 56 around that portion of conduit 22 extending thereinto, vertical plate baffles 71 are connected between the upper end of pipe 22 and the plates 62 in the vessel drain section. Connected to opposite sides of the vessel 56 are vapor inlet pipe 54 with valve 55 therein and vapor outlet pipe 80.

In operation, contact material is directed into the passageway 73 by pipe 40 and then flows downwards therethrough as a substantially continuous column of closely packed particle form contact mass material. The contact material then passes into pipe 22 through the funnel formed by plates 61 and 62 and finally passes down through pipe 22 to the convertor (not shown) which is operating under a gaseous pressure. It can be seen that the column of contact material in passageway 73 is essentially an unbroken continuation of the column of contact material in pipe 22. Inert vapors from the convertor after passing upwards through the column of contact material in pipe 22 passes through the column of contact material in column 73 or through part of said column and disengages therefrom at the contact material surfaces in the slot spaces 75 between baffle plates 59 adjacent the vapor outlet section 74 of vessel 56. This tends to accumulate undersized contact material particles at said disengaging surfaces. Additional vapor charged through control valves 55 and pipe 54 into inlet chamber 72 pass horizontally across the column of contact material in passageway 73 and also disengage therefrom at said disengaging surfaces. The combined velocity of these two vapor streams in the slotted spaces between baffles 59 adjacent the vapor outlet section 74 is thus maintained sufficient to result in the entrainment of the undersized contact material particles into the section 74 but insufficient to so entrain the normal size particles. The cross sectional area of the section 74 being considerably greater than that of the slot spaces 75 between baffles 59, the vapor velocity in said section 74 falls below that required to entrain the undersized contact material and said contact material falls to the drain section 76 of vessel 56 from which it is withdrawn through pipe 42 and control valve 50 therein. The effluent vapor passes from the system through pipe 80.

The above operation takes advantage of the fact that larger solid particles are entrained in vapor streams only at considerably higher vapor stream velocities than are smaller particles of the same density. The vapor rate required to entrain the undersized material without entraining the normal size material will vary dependent upon the inherent variables in any given application such as size, shape and density of contact material particles, the nature of the vapor and the temperature and pressure of the operation. Thus the required rate must be experimentally determined for each application but with proper apparatus design considerable flexibility of vapor rate is obtainable merely by regulation of vapor rate charged through pipe 54. Experimental work has shown that for an ordinary granular clay type catalyst of an apparent unpacked density of about 37 pounds per cubic foot, the linear velocity of atmospheric pressure air at 80° F. required to entrain particles of 0.10 inch and 0.02 inch diameter was about 30 feet per second and 6 feet per second respectively.

As has been hereinbefore stated a certain maximum percentage of undersized contact material particles may be swept down through the convertor feed pipe into the convertor by the normal size particles without interruptions in the continuous flow of contact material through said feed pipe. Thus it becomes necessary only to remove from the system any excess undersized particle form contact material over this maximum limiting percentage, although more may be removed if desired. Since the maximum limiting percentage of undersized contact material which may pass down through the convertor feed pipe without interruption of the contact material flow is dependent upon a number of variables such as the relative difference in the diameter of the undersized contact material and the average diameter of the normal sized contact material, the rate of contact material flow through the feed pipe and the nature of the vapor and the rate of flow thereof in the feed pipe, it is obvious that no single limiting percentage figure may be given for the operation of this invention and that the limiting percentage value must be determined for each specific application. With the aid of disclosures given in this specification those skilled in the art may readily make such determinations. As an example of the determination of this value for a specific application, it was found that when a particle form contact material having an apparent unpacked density of 48 pounds per cubic foot and an average particle size of about 0.027 inch diameter was passed downwards at a linear velocity of about 22 feet per minute through a vertical pipe having a length of 20 feet and terminating in a chamber wherein an air pressure of 5 pounds per square inch gauge and temperature of 70° F. is maintained over an accumulation of contact material, the maximum percentage of undersized contact material particles of diameter less than about .016 inch which may be swept down through said pipe without interruption of the flow of contact material in said pipe is in the order of 5 to 10 per cent by weight of the total contact material flow.

It should be understood that the various embodiments of this invention and examples of its operation and application given herein are intended to be merely exemplary in character and are not intended in any way to limit the scope of this invention except insofar as such limitations are specified in the appended claims.

I claim:

1. In a process of the type described the method of introducing particle form contact mass material to a convertor against a gaseous pressure therein, comprising: continuously supplying said contact material to said convertor from an elongated confined substantially compact stream of particle form contact material extending upwards from said convertor and having a greater head of contact material than the pressure in said convertor; continuously supplying particle form contact mass material to the upper end of said confined substantially compact stream of contact material; permitting the flow up through said confined stream of contact material of limited quantities of gas induced by the positive pressure differential between said convertor and said upper supply end of said stream of contact material and causing said gas to disengage from said contact material at surfaces located along a longitudinal section of said stream adjacent the upper supply end thereof; passing additional gas transversely across said longitudinal section of said stream and disengaging said gas from surfaces along the opposite side of said longitudinal section of said stream along with said gas from said convertor; substantially preventing entrainment of normal size contact material in the disengaging gas from said longitudinal section of said column by control of rate of flow of said additional transversely flowing gas, but permitting the entrainment in said disengaging gas of at least that quantity of undersized contact mass material particles which is in excess of the quantity of such material which may be swept by normal size contact material particles down in said stream of contact material into said convertor without interruption of the flow of said contact material in said column; and withdrawing said disengaged vapors and entrained undersized contact material from the system.

2. In a process of the type described the method of introducing particle form contact mass material to a convertor against a gaseous pressure therein, comprising: continuously supplying said contact material to said convertor from an elongated confined substantially compact column of particle form contact material extending upwards from said convertor and having a greater head of contact material than the pressure in said convertor; continuously supplying particle form contact material to a continuation section of the upper end of said confined column of contact material, said continuation section of said column being confined on two sides by impervious solid walls and on two oppositely opposed sides by foraminate walls pervious to the flow of gas therethrough but impervious to the normal gravitational flow of contact material particles therethrough; permitting the flow up through said confined column of contact material of the limited quantities of gas induced therethrough by the pressure in said convertor and withdrawing said gas from the specially confined continuation of said column through one of said foraminate confining walls; passing controlled quantities of additional gas through the other of said foraminate confining walls, transversely across the confined continuation of said contact material column and withdrawing said additional gas through the opposite foraminate wall along with said gas from said convertor, said gas being withdrawn without the entrainment therein of any substantial amount of normal sized contact mass material particles but with the entrainment of at least that quantity of undersized contact material particles in excess of the quantity of such material which may be swept by normal size contact material particles down in said column of contact material into said convertor without interruption of the flow of said contact material in said column; and withdrawing said effluent vapors and entrained undersize contact material from the system.

3. In an apparatus of the type described an apparatus for continuously introducing particle form contact mass material against a gaseous pressure in a contacting vessel wherein gases are contacted with a continuously flowing substantially compact mass of particle form contact mass material, comprising an elongated contact material feed pipe connected to said contacting vessel and extending upwards therefrom, said feed pipe being of sufficient height that the head of the substantially compact column of particle form contact mass material maintained therein will be greater than the pressure in said contacting vessel; a supply hopper located above the upper extremity of said feed pipe; two oppositely opposed upwardly extending foraminate walls, pervious to flow of vapor therethrough and impervious to the gravitational flow of particle form contact material therethrough when the contact material flow is as a substantially compact column, said walls being spaced apart and positioned elevationally between said supply hopper and said feed pipe thereby forming a contact material passageway therebetween; impervious means defining the remaining walls of said passageway; means for continuously supplying particle form contact material to said supply hopper; means defining an unobstructed, vertical passage for gravity flow of contact material from said hopper to said passageway; means for directing flow of contact material from said passageway to said feed pipe; means to enclose said foraminate walls, thereby forming gas inlet chamber on one side thereof and a gas outlet chamber on the opposite side thereof; means to introduce gas at a controlled rate into said inlet chamber; means to withdraw gas from said outlet chamber and means to withdraw undersized contact material particles from said outlet chamber.

4. In an apparatus of the type described wherein a particle form contact mass material is continuously introduced against a gaseous pressure into a contacting vessel wherein gases are contacted with a continuously flowing substantially compact mass of particle form contact mass material, in combination: a contacting vessel, an elongated contact material feed pipe connected to said contacting vessel and extending upwards therefrom, said feed pipe being of sufficient height that the head of the substantially compact column of particle form contact mass material maintained therein will be greater than the pressure in said contacting vessel; a supply hopper located above the upper extremity of said feed pipe; a closed vessel connected between said hopper and said feed pipe; two upwardly extending oppositely opposed foraminate walls, pervious to flow of vapors therethrough and impervious to gravitational flow of contact material particles therethrough when the downward flow of contact material between said walls is as a substantially compact column, said walls being spaced apart and positioned within said vessel and extending from wall to wall of said vessel in one direction so as to divide it into a gas inlet chamber on one side of said walls, a contact material passageway between said walls and a gas outlet passage on the opposite side of said walls; means for continuous supply of particle form contact material from said hopper to the upper end of said passageway in said closed vessel; means for directing contact material flow from said passageway to said feed pipe; means to introduce gas at controlled rates into said gas inlet chamber; means to withdraw said gas from said gas outlet chamber; means to withdraw controlled quantities of undersized contact material from said outlet chamber, means to continuously supply particle form contact material to said supply hopper, and means to maintain an inert gaseous pressure in the upper end of said contacting vessel above the gaseous pressure in said supply hopper.

THOMAS P. SIMPSON.

REFERENCES CITED

The following references are of record in the file of this patent:

UNITED STATES PATENTS

| Number | Name | Date |
| --- | --- | --- |
| 890,625 | Edison | June 16, 1908 |
| 2,290,580 | Degnen et al. | July 21, 1942 |
| 2,321,015 | Davis | June 8, 1943 |
| 2,348,156 | Sheppard | May 2, 1944 |
| 2,376,365 | Lassiat | May 22, 1945 |